US012663265B2

(12) United States Patent
Niklaus et al.

(10) Patent No.: US 12,663,265 B2
(45) Date of Patent: Jun. 23, 2026

(54) REFERENCE FREE CALIBRATION METHOD FOR A POINT CLOUD MEASURING MODULE COMBINED WITH A GEODETIC SINGLE POINT MEASUREMENT UNIT

(71) Applicant: LEICA GEOSYSTEMS AG, Heerbrugg (CH)

(72) Inventors: Christian Niklaus, Bad Ragaz (CH); Bianca Gordon, Rebstein (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 613 days.

(21) Appl. No.: 18/120,387

(22) Filed: Mar. 11, 2023

(65) Prior Publication Data

US 2023/0288201 A1 Sep. 14, 2023

(30) Foreign Application Priority Data

Mar. 11, 2022 (EP) .................................... 22161744

(51) Int. Cl.
*G01C 15/00* (2006.01)
*G01C 25/00* (2006.01)
(52) U.S. Cl.
CPC ......... *G01C 15/004* (2013.01); *G01C 25/005* (2013.01)
(58) Field of Classification Search
CPC .. G01C 15/004; G01C 25/005; G01C 15/002; G01C 25/00; G01S 7/497; G01S 17/66
(Continued)

(56) References Cited

U.S. PATENT DOCUMENTS 6,411,371 B1 * 6/2002 Hinderling ............ G01S 7/4812
356/5.1
7,065,461 B2 * 6/2006 Chang .................... G06Q 10/04
702/81
(Continued)

FOREIGN PATENT DOCUMENTS

CN 111505606 A 8/2020
EP 2 141 450 A1 1/2010
(Continued)

OTHER PUBLICATIONS

Extended European Search Report dated Aug. 29, 2022 as received in Application No. 22161744.2.
(Continued)

*Primary Examiner* — Peter J Macchiarolo
*Assistant Examiner* — Anna Josephine Saunders
(74) *Attorney, Agent, or Firm* — Maschoff Brennan

(57) ABSTRACT

A survey instrument comprising a single point measurement unit, a point cloud measuring module, and a computing unit. The single point measurement unit is configured to generate first measurement data comprising coordinates a point. The point cloud measuring module has a fixed pose relative to the single point measurement unit, and configured to generate a second measurement data comprising coordinates of a plurality of points. The computing unit stores calibration parameters and is configured to generate a point cloud based on the second measurement data, to merge it with the first measurement data and to detect surfaces and object edges in it. The survey instrument is configured to execute a calibration using object edges in the setting. The single point measurement unit acquires a set of single measuring points including at least two on each flat surfaces of the object edges.

17 Claims, 3 Drawing Sheets

(58) Field of Classification Search
USPC ........... 33/286; 356/4.01, 5.01, 5.1; 382/106
See application file for complete search history.

(56) References Cited

U.S. PATENT DOCUMENTS

| | | | | |
|---|---|---|---|---|
| 8,699,756 | B2 * | 4/2014 | Jensen | G01S 17/89 |
| | | | | 382/106 |
| 9,658,335 | B2 * | 5/2017 | Siercks | G01C 15/002 |
| 2014/0009604 | A1 * | 1/2014 | Hinderling | G01S 7/4972 |
| | | | | 348/142 |
| 2014/0226145 | A1 * | 8/2014 | Steffey | G01S 17/89 |
| | | | | 356/4.01 |
| 2014/0300892 | A1 | 10/2014 | Zogg et al. | |
| 2015/0029489 | A1 * | 1/2015 | Metzler | G01S 7/4812 |
| | | | | 356/4.01 |
| 2016/0138919 | A1 * | 5/2016 | Green | H04N 23/633 |
| | | | | 348/135 |
| 2016/0314593 | A1 | 10/2016 | Metzler et al. | |
| 2018/0211367 | A1 * | 7/2018 | Blaser | G01S 17/42 |
| 2020/0386548 | A1 * | 12/2020 | Müller | G01S 17/08 |
| 2021/0149030 | A1 * | 5/2021 | Niklaus | G01S 17/89 |
| 2022/0187592 | A1 * | 6/2022 | Hinderling | G02B 26/0875 |
| 2023/0288201 | A1 * | 9/2023 | Niklaus | G01C 15/002 |

FOREIGN PATENT DOCUMENTS

| | | | |
|---|---|---|---|
| EP | 2 219 011 | A1 | 8/2010 |
| EP | 3 483 554 | A1 | 5/2019 |
| EP | 3 495 769 | B1 | 1/2021 |
| EP | 3 792 593 | A1 | 3/2021 |
| WO | 97/40342 | A2 | 10/1997 |
| WO | 2013/113759 | A1 | 8/2013 |

OTHER PUBLICATIONS

CN Office Action dated Feb. 25, 2026 as received in Application No. 202310199995.8.

* cited by examiner

REFERENCE FREE CALIBRATION METHOD FOR A POINT CLOUD MEASURING MODULE COMBINED WITH A GEODETIC SINGLE POINT MEASUREMENT UNIT

FIELD

The present disclosure relates to a geodetic survey instrument comprising a single point measuring unit and a point cloud measuring module, a method for a reference free field calibration for the geodetic survey instrument and a computer program product based on it.

BACKGROUND

To capture topographic information on setting in particular a surface of an object, in particular a building or a construction site, scanning methods are typically utilized. The topography of the setting is typically represented by a contiguous point cloud, in particular a point cloud with at least thousand points per square meter resolution at a distance of 5 meter from the point cloud measuring module, or with alternative wording at least 2.5 point per msr. A common method for scanning the surfaces is the utilization of scanning modules, in particular laser scanning modules, the scanning module scans the surface of objects with a scanning beam, in particular laser-beam, and the topography of the setting is generated by combining the measured distance information with an emission angle of the scanning beam. By the way of example laser scanners are presented from here on as a representative of a generic point cloud measuring module or instrument. The specific features of other types of point cloud measuring modules or instruments, in particular time of flight cameras, might be applied accordingly.

Laser scanning modules and methods for their utilization are known in the prior art and are disclosed for example in WO 97/40342. The scanning is typically executed by deflecting the beam with an appropriate optical element, for example a fast rotating mirror. One typical utilization of the scanning modules is so that they are mounted on a fixed basis comprising at least one further motorized axis to change, measure and record the emission angle in two degrees of freedom.

Another possibility for the utilization is a mobile scanning system, wherein the scanning module is mounted on a mobile platform in particular on a platform, which allows the movement on a linear track, and the scanning of the setting takes place during the movement of the scanning platform. Such systems are particularly useful for scanning linearly navigable settings for example a tunnel, an airport runway or a section of a road or a railway track.

Such setups depending on the required point-to-point resolution allows a continuous and time efficient scanning of the setting, however the position accuracy of the point coordinates is not sufficient to fulfil the high geodetic accuracy standards.

For a dynamic environment, in particular a construction site, the task is not only to capture topography information, but also to combine this information with the relative or absolute position of the key features. The position information should also fulfil the geodetic accuracy standards, in particular the position must be known with centimetre accuracy or better. The task may also involve the tracking of moving objects and providing at least their relative position in respect to the key features of the setting.

To gain information with the required accuracy from static or moving objects geodetic survey instruments, in particular total stations, tachymeters and motorized theodolites, are commonly used. Geodetic survey instruments comprise a single point measuring unit configured to provide polar coordinates and/or derived Cartesian coordinates of a single point or a plurality of single points according to the geodetic accuracy standards.

Total stations are a common class of geodetic survey instruments. By the way of example total stations are presented from here on as a representative of a generic geodetic survey instrument. The specific features of other types of geodetic survey instruments might be applied accordingly. Total stations essentially comprise a targeting unit, single point distance measuring elements, in particular laser rangefinders, and angle sensors, with accuracy in the range of angular seconds.

Contemporary total stations are typically characterized by a compact design comprising typically co-axial single point distance measuring elements, in particular laser rangefinders, and targeting unit, computing, controlling and data storage units in a single portable device. Total stations are often used in combination with a retroreflective target object in particular a circular prism, and for such applications total stations are typically comprising an automatic target search and tracking function. Objects equipped with retroreflective targets are commonly known as cooperative targets, while other targets, in particular diffusely reflective targets, are commonly known as non-cooperative targets.

To sight and target a designated target point generic total stations are equipped with a telescopic sight such as optical telescope. The telescopic sight can be aligned with the target point by pivoting and tilting the total station system. By way of example, such a sighting device of a geodetic measuring device is described in EP 2 219 011. The polar coordinates of the target points are then determined. A distance of the targeted object is determined by a range finding method, in particular with a laser rangefinder, while elevation and azimuth angles might be derived from angle readings provided by the angle sensors comprised by the survey instrument, in particular comprised by the single point measurement unit. By the way of example, the coaxial targeting unit and single point measuring elements are referred from here on as a targeting/rangefinder unit. By the way of example, unless otherwise specified distance from/to the survey instrument will mean distance from the single point measuring unit, particularly from the targeting/rangefinder unit. By the way of example azimuth angle unless otherwise specified is an angle to a reference direction, in particular to the north direction, while the elevation angle is an angle to the horizon, in particular to a calibrated horizon.

Often the target object cannot be targeted with a sufficient precision required for geodetic measurements despite the 30× optical magnification. For that purpose contemporary total stations might be equipped with an Automatic Target Recognition function (ATR) for cooperative targets. EP 2 141 450 discloses a measuring device with ATR functionality.

A device and a measurement protocol for marking and measuring the position of non-cooperative targets is also disclosed in the prior art for example in U.S. Pat. No. 6,411,371 B1.

Contemporary total stations can also reference the instrument to an external coordinate system by precisely recording the reference marks in the environment. Upon determining such an external coordinate system all coordinative operations may be referenced to this external or a global coordinate system.

Contemporary total stations may also be equipped with a set of wireless modules which enable them to communicate with different types of external units, a non-exclusive list of external units comprise another survey instruments, handheld data acquisition device, field computers or cloud services.

The single point measuring unit is configured for determining the position of a limited amount of points as well as to track moving objects with a precision fulfilling the requirements of geodetic accuracy. However, due to the cumbersome nature of the measurement they are not ideal for generating a scan of a setting with the desired point-to-point resolution.

The benefits of combining the single point measurement units, which can deliver high single point accuracy, with the dedicated point cloud measuring module, in particular laser scanners, which can deliver a point cloud representation of a setting with high point to point resolution is already recognized and known in the prior art. E.g. WO2013/113759A1 or EP 3 495 769 B1 discloses a survey instrument comprising the single point measuring unit and the dedicated point cloud measuring module.

Positioning two optical systems along a common optical axis is known in the prior art. For example, US 2014/0226145 A1 discloses such a device. This choice provides the two systems with a common gimbal position, however constraints the design by the requirement of common optical elements, which forces the designer for suboptimal choices regarding the point cloud measuring module and the single point measurement unit, in particular in the choice of the beam deflection mechanism, or the apertures, or the laser wavelengths.

Providing two dedicated optical paths for the point cloud measuring module and the single point measurement unit can maximize the benefits of combining the two instruments. In this setup, however at least the relative pose of the point cloud measuring module to the single point measurement unit have to be determined. The relative pose comprises the distance of the two instruments from each other and an orientation difference of the optical axes. Some solutions for this problem are known from the prior art. An exemplary calibration routine based on method wherein the operator targets at least three points per at least three surfaces is disclosed in EP 3 483 554 B1. These calibration methods are either based on the measurement of reference objects, i.e. dedicated cooperative targets in particular previously positioned retroreflectors or direct operator action by designating the multiple points to be targeted by the single point measurement unit.

SUMMARY

In view of the above circumstances, the object of the present disclosure is to provide an automatized, reference free field calibration method for a geodetic survey instrument comprising a single point measurement unit, a point cloud measuring module and a computing unit.

The disclosure relates to a survey instrument, in particular a total station, a tachymeter, a theodolite, a laser tracker, or an indoor positioning system comprising a single point measurement unit, a point cloud measuring module, in particular a laser scanner, and a computing unit.

The single point measurement unit is configured to generate a first measurement data comprising a distance from the survey instrument, an elevation angle, and an azimuth angle of a single point. The first measurement data might comprise the distance from the survey instrument, the elevation angle, and the azimuth angle of a plurality of single points. The first measurement data may also comprise further data derived from other pieces of the first measurement data, in particular Cartesian-coordinates, or mathematical objects, even more particular lines and planes, fitted to the coordinates of the plurality of single points.

The first measurement data may also comprise the absolute position of the single point measurement unit in a local or a global reference system. The absolute position of the single point measurement unit might be derived from measuring the distance from the survey instrument, the elevation angle, and the azimuth angle of pre-known reference points. Needless to say that the absolute position of the single point measurement unit might also be provided by other means. The survey instrument is configured to provide the first measurement data fulfilling the geodetic survey accuracy standards, in particular providing absolute or relative coordinates with at least centimeter accuracy.

By the way of example the single point measurement unit might comprise one or more angle sensors, or might retrieve data from other angle sensors comprised by the survey instrument. The single point measurement unit is configured to emit a measuring beam, in particular a laser beam to determine a distance from the survey instrument.

The point cloud measuring module is configured to generate, by scanning a setting, a second measurement data comprising coordinates of a plurality of scan points. The point density of the scan points fulfill the requirements of a contiguous point cloud, in particular the point density is at least thousand points per square meters at a distance of 5 meter from the point cloud measuring module, or alternatively formulated 2.5 point per msr.

The point cloud measuring module might be arranged or arrangeable to the single point measurement unit. At least during the calibration and the following calibrated measurement operations the point cloud measuring module has a fixed pose relative to the single point measurement unit. The fixed pose might be a permanent pose, wherein the point cloud measuring module is not detachable. The fixed pose can also be a temporary pose, wherein the point cloud measuring module might be detachable and re-attachable to nearly the same pose. Reattaching the point cloud measuring module so, that its new fixed posed to the single point measuring module is substantially different from its previous fixed pose is also possible for some embodiments of the survey instrument. It is self-evident for the person skilled in the art that detaching and reattaching the point cloud measuring module might lead to a need of a further calibration.

In some specific embodiments the point cloud measuring module is a laser scanner. In some even more specific embodiments the laser scanner comprises a motorized, rotatable beam deflector.

Needless to say other embodiments of the point cloud measuring module are also possible. The point cloud measuring module might be based on or might comprise one or more cameras in particular one or more time of flight cameras.

In some embodiments, the point cloud measuring module is laterally arranged on the survey instrument. Other arrangements, in particular arranging more than one point cloud measuring modules, are possible for some embodiments of the survey instrument. By the way of example, unless specified otherwise, the survey system comprises a single point cloud measuring module. The specific features of the survey systems comprising a plurality of point cloud measuring modules or instruments, might be applied accordingly.

The computing unit stores calibration parameters comprising the fixed pose between the single point measurement unit and the point cloud measuring module. The calibration parameters might also comprise intrinsic calibration parameters of the point cloud measuring module. The computing unit is configured to generate a calibration point cloud based on the second measurement data, wherein the calibration point cloud represents the setting, and to merge the calibration point cloud with the first measurement data based on the calibration parameters. The computing unit is further configured to detect flat surfaces and object edges in the setting by analyzing the calibration point cloud. Needless to say that the computing unit is configured to carry out generic mathematical operations, in particular determining distances and angles in the merged data.

It is also self-evident that during merging of the first and second measurement the data, an origin of the data, i.e. whether a specific piece of data arise from the first or second measurement data can be conserved. Derived pieces of data might also be characterized accordingly, whether they derived solely from pieces of data with first measurement data origin, solely from pieces of data with second measurement data origin, or from pieces of data with both the first and second measurement data origin. The computing unit may respect the origin of the pieces of data during the data processing, i.e. the computing unit may only carry out some mathematical operations if the specific piece of data arise from the first measurement data and the other way around.

The survey instrument may be configured to carry out an ATR functionality. This means that the survey instrument can recognise the target objects, in particular retro-reflecting targets and determine their absolute or relative position without further operator action. The survey instrument may also update the first measurement data comprising the distance from the survey instrument the elevation angle and the azimuth angle if the target point has moved. The survey instrument may seek target points with known absolute position to determine the absolute position of the survey instrument.

The survey instrument is configured to execute a calibration functionality. The calibration functionality comprises the automatic execution of the following steps. The point cloud measuring module acquires the second measurement data as a calibration point cloud. The computing unit identifies at least two non-parallel object edge in the calibration point cloud. The object edges are defined by a respective first flat surface and a respective second flat surface. For each of the at least two object edges the single point measurement unit scans across the object edge with the measuring beam and acquires a set of single measuring points comprising at least two points on each flat surfaces of the object edge. The measuring points laying on a straight-line scan-path, which means that the azimuth angle and the elevation angle of the measuring points show a linear relation. Or with alternative wording the single point measurement unit and the set of measurement points lay in a common plane. Or with another alternative wording, the measuring points, from the point of view of the survey instrument, are aligned to a line. The computing unit derives a vertex formed by the distribution of the measurement points, wherein the vertex corresponds to the object edge. The calibration parameters are updated based on the alignment of the object edges and the derived vertices.

In some specific embodiments the scanning of the setting, the generation of the calibration point cloud, the detection of the object edges, the selection of the object edges and the further calibration steps are carried out in a single unbroken calibration process. Nevertheless, the calibration process might comprise one or more pauses. By the way of example the calibration process may be paused after the acquisition of the second measurement data, wherein the computing unit stores the second measurement data and the stage of the calibration. The further calibration steps, based on the stored calibration parameters, are carried out after the continuation of the calibration process is requested. A non-exclusive list of some further possible calibration process pauses comprise: after the generation of the calibration point cloud, after the detection of the suitable object edges, after the selection of the first and second object edge. The computing unit stores the state of the calibration process, the generated data and proceed with the calibration further upon requesting the continuation of the calibration process. Needless to say that the operator or the computing unit itself might also abort the calibration process, in particular upon a detection of an error.

In some specific embodiments, the computing unit is permanently arranged on the single point measuring unit. In other embodiments the computing unit is temporarily arranged or arrangeable on the single point measuring unit. The computing unit can also be a separate entity, in particular a field computer or a handheld device. For embodiments where computing unit is not arranged on the single point measurement unit the survey instrument may comprises a respective wired or wireless interface configured for data exchange between the computing unit and the further components of the survey instrument.

In some specific embodiments the single point measurement unit comprises the targeting/rangefinder unit configured to be tilted around a tilting axis, and a first angle sensor, wherein the first angle sensor is configured to measure a first angle as a tilting angle of the targeting/rangefinder unit. The computing unit is configured to retrieve the first angle.

In some specific embodiments, the single point measurement unit is mounted on a base and configured to be rotated relative to the base around a rotation axis, in particular a vertical axis. The survey instrument further comprises a second angle sensor configured to measure a second angle of the single point measuring unit relative to the base. The computing unit is configured to retrieve the second angle.

The disclosure further relates to a calibration method for the survey instrument, in particular a total station, a tachymeter, a theodolite, a laser tracker, or an indoor positioning system. The survey instrument comprises the single point measurement unit, the point cloud measuring module, in particular the laser scanner, and the computing unit.

The calibration method comprises the following steps 1) acquiring the second measurement data as the calibration point cloud with the point cloud measuring module 2) identifying at least two non-parallel object edges in the calibration point cloud, wherein the object edges are each defined as an intersection of the first flat surface and the second flat surface of the respective object edge 4) for each of the at least two object edges scanning across the object edge with the single point measurement unit wherein the set of single measuring points including at least two points on each flat surfaces of the object edge is acquired, the single measuring points laying on a straight-line scan-path, 5) deriving the vertex formed by the distribution of the measuring points, the vertex corresponding to the object edge, optionally steps 3-5 could be repeated correspondingly if adding further optional edges deems beneficial 6) updating calibration parameters based on the alignment of the object edges and the derived vertices.

In some specific embodiments of the method the determination of the vertices comprises 1) dividing the set of single measuring points, into a first set of points laying on the first flat surface and a second set of points laying on the second flat surface 2) determining a respective first line and a respective second line for each of the object edges with the computing unit by fitting the first and second set of points using a weighted fitting method, in particular a weighted least square fitting 3) determining with the computing unit the vertex, for each of the object edges, wherein the vertex is an intersection point of the first line and the second line.

While the determination of further set of measuring point, in particular first set of points, further second set of points, further first lines, further second lines, and further vertices, in particular further intersection points, for the respective object edge are not mandatory, the calibration method is not limited to the generation of a single vertex per object edge.

The calibration steps are carried out in the form of an automated calibration routine, where no further steps are required from the operator.

The computing unit may store an absolute or relative position of the detected object edges. The absolute position of the survey instrument or the relative position of the survey instrument regarding the stored absolute or relative position of the object edges may be determined at any stage In some specific embodiments, for at least one of the object edges, the set of single measuring points lay in a plane perpendicular to the object edge.

In some specific embodiments for at least one of the object edges, the set of single measuring points are acquired in a continuous scan, i.e. the rate of change for the first angle and the second angle are respectively constant during the acquisition process. Alternative embodiments, where the movement of the axes of the survey instrument is paused during the acquisition or alternative approach paths, wherein between the single measuring points the survey instrument does not follow a straight line scan path are also possible for a survey instrument/calibration method.

In some specific embodiment, for at least one of the object edges, the set of single measuring points is acquired so that the first angle or the second angle remains fixed during the acquisition.

In some specific embodiments at least one point measured in at least on the flat surfaces of one of object edges is a reference marker. In some even more specific embodiments the calibration parameters comprises the absolute position of the reference marker.

In some specific embodiments, further object edges are selected. In some even more specific embodiments the selected object edges are characterized by at least one, preferably all, of the following 1) the distance from the point cloud measuring module for at least two object edges are substantially different by the way of example by a factor larger than two 2) the azimuth angles of at least two object edges are substantially different, by the way of example the difference is at least 90° preferably approximately 180° 3) the elevation angles are substantially different for two object edges, by the way of example the difference is at least 20°.

In some specific embodiments, the first object edge and the second object edge are perpendicular to each other. In some even more specific embodiments a third object edge is also selected, wherein the third object edge is perpendicular to both the first and the second object edge.

In some embodiments, the selection of the object edges is based on a merit function, which comprises a parameter that is based on at least one of 1) a bending radius of the object edge, 2) a length of the object edge, 3) a corner angle, 4) angles of incidence for the first and second flat surface, 5) a flatness of the first and second flat surfaces, or 6) a mean intensity of the first and second flat surfaces. Needless to say that the selection according to the merit function can also be combined with other selection methods, in particular with those disclosed above.

The disclosure further relates to a computer program product for the survey instrument which, when executed by the computing unit, causes the automatic execution of the steps of a selected embodiment of the calibration method.

The computer program product may also comprise different options for selecting the merit function, wherein the merit function comprises a parameter that is based on at least one of 1) the bending radius of the object edge, 2) the length of the object edge, 3) the corner angle, 4) angles of incidence for the first and second flat surface, 5) the flatness of the first and second flat surfaces, or 6) the mean intensity of the first and second flat surfaces.

The computer program product might also comprise a data sharing functionality, wherein the data sharing functionality allows the data exchange between further survey instruments, further computing units or a server, in particular a server providing cloud services. The shared data may comprise the calibration point cloud, the absolute position of the single point measurement unit instrument, the absolute and/or relative position of object edges and/or reference markers.

BRIEF DESCRIPTION OF THE DRAWINGS

By way of example only, specific embodiments will be described more fully hereinafter with reference to the accompanying figures, wherein.

DETAILED DESCRIPTION

Figure 1A:
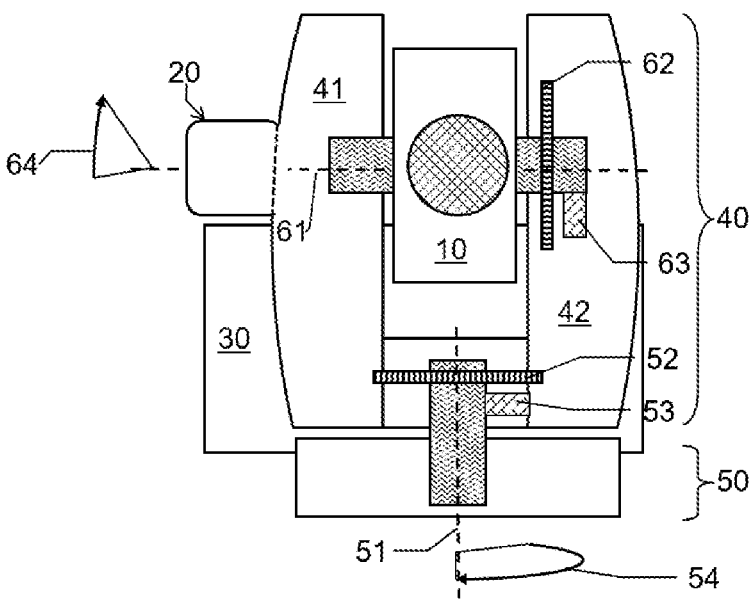
FIG. 1a shows the survey instrument comprising the single point measurement unit, the point cloud measuring module, and the computing unit integrated into a single, portable instrument.

FIG. 1a shows a schematic depiction of a first embodiment of the survey instrument comprising the single point measurement unit, the point cloud measuring module 20 and the computing unit 30. The single point measurement unit comprises the targeting/rangefinder unit 10. By the way of example the single point measurement unit, the point cloud measuring module 20 and the computing unit 30 are integrated into a portable survey instrument 40. Alternative embodiments where only the single point measurement unit and point cloud measuring module 20 are arranged to a single device and the computing unit 30 is a separate entity are also possible. For embodiments where the computing unit 30 is a separate entity, the computing unit 30 might be temporarily arranged or arrangeable on the single point measurement unit.

The main frame of the portable survey instrument 40 comprises a first column 41 and a second column 42, wherein the targeting/rangefinder unit 10 is attached to both columns 41,42 so that it is tiltable around a tilting axis 61. The tilting of the targeting rangefinder unit 10 is preferably realized by a motorized axis 62. Manual tilting around the tilting axis 61 may also be possible under certain circumstances. The survey instrument comprises a first angle sensor 63 configured to measure a first angle 64 of the tilting axis 61. The point cloud measuring module 20 in the depicted embodiment is arranged to the side to first column 41 of the main frame of the instrument 40. The fixed pose of the point cloud measuring module 20 relative to the single point measurement unit comprises a distance to the targeting/ rangefinder unit 10 in the vector form and the orientation difference of the emission axes of the point cloud measuring module 20 and the targeting/rangefinder unit 10.

The in FIG. 1a depicted embodiment of the portable integrated survey instrument 40 is configured to be mounted on a base 50 and being rotatable about a rotational axis 51. The rotation axis 51 might be a vertical axis during the calibration and measurement operations. The survey instrument 40 may be rotated manually under certain circumstances or preferably by a motorized axis 52. The survey instrument comprises a second angle sensor 53 configured to measure a second angle 54 of the single point measuring unit relative to the base 50. The first (tilting) 64 and second (rotational) angle 54 of retrieved by the first 63 and second angle sensors 53 are transferred to the computing unit 30.

Figure 1B:
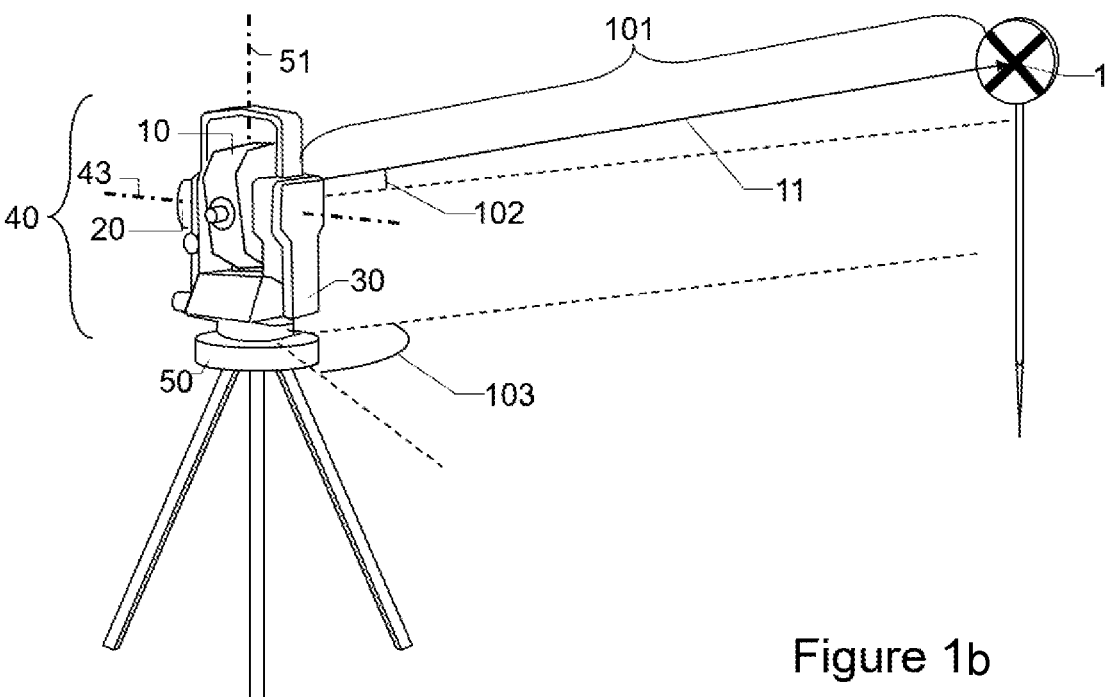
FIG. 1b shows the relevant angles and distances for generating the first measurement data.

FIG. 1b shows the single point measurement unit generating first measurement data comprising the distance from the survey instrument 101, the elevation angle 102, and the azimuth angle 103 of the single point or the plurality of points. The single point measurement unit is configured to generate the measuring beam 11, in particular a laser beam. The single point measurement unit in the depicted embodiment generates the distance from the survey instrument 101 via the principle of laser range finding, in particular time of flight measurement of a laser pulse or laser interferometry. The elevation 102 and azimuth angles 103 of the measured single point may be derived from the said first 64 and second angles 54 measured by the first 63 and second angle sensors 53. The first measurement data may also comprise the absolute position of the single point measuring unit. A targeted object 1 may be a reference marker with a known absolute position. The first measurement data may comprise the known absolute position of the targeted object 1; alternatively, the absolute position of the single point measurement unit might be determined using the absolute position of multiple reference markers.

The relative and absolute position of the measured single point or the measured plurality of single points derived from the first measurement data fulfil the geodetic accuracy standards, in particular centimetre accuracy for the relative or absolute position.

The survey instrument 40 may be configured to carry out an ATR functionality. This means that the survey instrument 40 can automatically generate and update the first measurement data comprising the distance from the survey instrument 101, the elevation angle 102, and the azimuth angle 103 of the target point 1.

Figure 2:
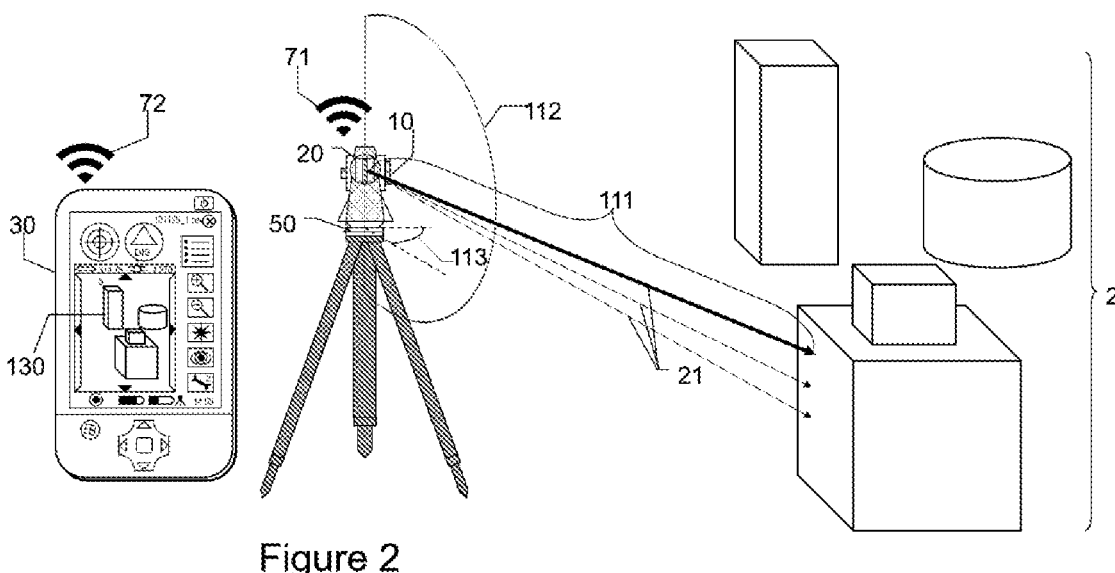
FIG. 2 shows the setting containing flat surfaces and object edges, the point cloud measuring module scans the setting, while the computing unit generates the calibration point cloud representing the setting.

FIG. 2 shows the setting 2 comprising multiple objects. By the way of example the survey instrument 40 comprising the single point measurement unit, which comprises the targeting/rangefinder unit 10, and the point cloud measuring module 20 is mounted rotably on the base 50. By the way of example the point cloud measuring module 20 is arranged laterally on the survey instrument 40. Other arrangement of the point cloud measuring module in the survey instrument 40 are also possible. Arranging multiple point cloud measuring modules 20 is also possible. The point cloud measuring module 20 might also be detachable and reattachable.

In the depicted embodiment the point cloud measuring module 20 emits the scanning beam 21, in particular a laser beam, which is deflected by the beam deflecting element, in particular the motorized fast rotating mirror. The second measurement data generated by the point cloud measuring module 20 comprises the emission angle 112 of the scanning beam 21, an azimuth angle 113 of the point cloud measuring module 20, which may be derived from the second angle 54 measured by the second angle sensor 53, and a distance of the measured point to the point cloud measuring module 111 for a plurality of measured points.

In the depicted embodiment the computing unit 30 is realized as a separate unit. In the depicted embodiment the survey instrument 40 comprises a wireless interface 71. The computing unit 30 comprises a further wireless interface 72. The wireless interfaces 71,72 are configured to allow an exchange of data between the computing unit 30 and the other components the survey instrument 40. Data exchange using a wired interface is also possible. The wireless interfaces 71,72, or wired interfaces with equivalent functionality, may also be configured to exchange data with further survey instruments, further computing units or with the server, in particular the server providing cloud services.

The computing unit 30 is configured to generate the calibration point cloud 130 from the second measurement data. The computing unit 30 is also configured to carry out mathematical operations within the calibration point cloud 130, in particular the detection of flat surfaces and object edges.

The computing unit 30 is further configured to store the calibration parameters comprising the fixed pose of the point cloud measuring module 20 relative to the single point measurement unit. The calibration parameters might comprise further parameters, in particular intrinsic calibration parameters of the point cloud measuring module 20. The computing unit 30 is further configured to merge the calibration point cloud 130 with the first measurement data based on the calibration parameters. The computing unit 30 is configured to carry out generic mathematical operations, in particular determining distances and angles in the merged data. During the merging of the first and second measurement data, the origin of the data, i.e. whether the specific piece of data arise from the first or second measurement data can be conserved. Derived pieces of data might also be characterized accordingly, that they derived solely from pieces of data with first measurement data origin, solely from pieces of data with second measurement data origin, or from pieces of data with both first and second measurement data origin. The computing unit 30 may respect the origin of the pieces of data during the data processing, i.e. the computing unit 30 may only carry some mathematical operations if the specific piece of data arise from the first measurement data and the other way around.

Figure 3:
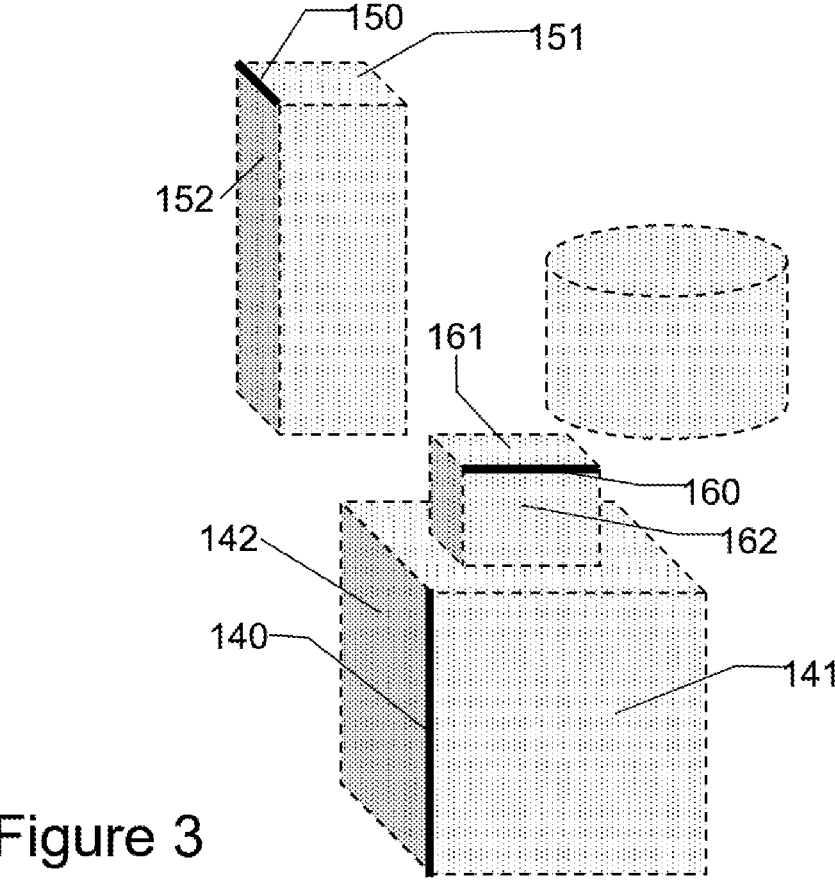
FIG. 3 shows the calibration point cloud representing the setting comprising object edges defined as the intersection of two flat surfaces

FIG. 3 depicts the calibration point cloud 130. The first object edge 140 is defined as the intersection of the flat surfaces 141 and 142, while the second object edge 150 is defined as the intersection of flat surfaces 151 and 152. While not mandatory for carrying out the calibration process, nevertheless the third object edge 160 may also be defined as the intersection of flat surfaces 161 and 162. Any further object edges can be defined according to the depicted schematics. The second object edge 150 is selected so that it is non-parallel to the first object edge 140.

The calibration method contains no restriction for an angle between the first 141,151,161 and second flat surfaces 142,152,162, only the presence of the clearly recognizable object edge 140,150,160. Object edges 140,150,160 where the angle between the first flat surface 141,151,161 and the second flat surface 142,152,162 are larger than 40° but smaller than 140° might be preferable. Object edges 140, 150,160 where the first flat surface 141,151,161 perpendicular to the second flat surface 142,152,162 might be even more preferable In a further specific embodiment the first object edge 140 and the second object edge 150 are perpendicular to each other. If defined, the third object edge 160 may also be perpendicular to the first 140 and second object edge 150.

In a further specific embodiment, the computing unit 30 may define a plurality of object edges 140,150,160. The computing unit may prefer object edges 140,150,160, wherein the selected object edges 140,150,160 are characterized by at least one, preferably all of the following 1) the distance 111 from the point cloud measuring module 20 for at least two object edges 140,150,160 are substantially different, by the way of example by a factor larger than two. 2) the azimuth angles 113 of the at least two object edges 140,150,160 are substantially different, by the way of example the difference is at least 90° preferably approximately 180° 3) the emission angles 112 for at least two object edges 140,150,160 are substantially different, by the way of example the difference is at least 20°.

Figure 4A:
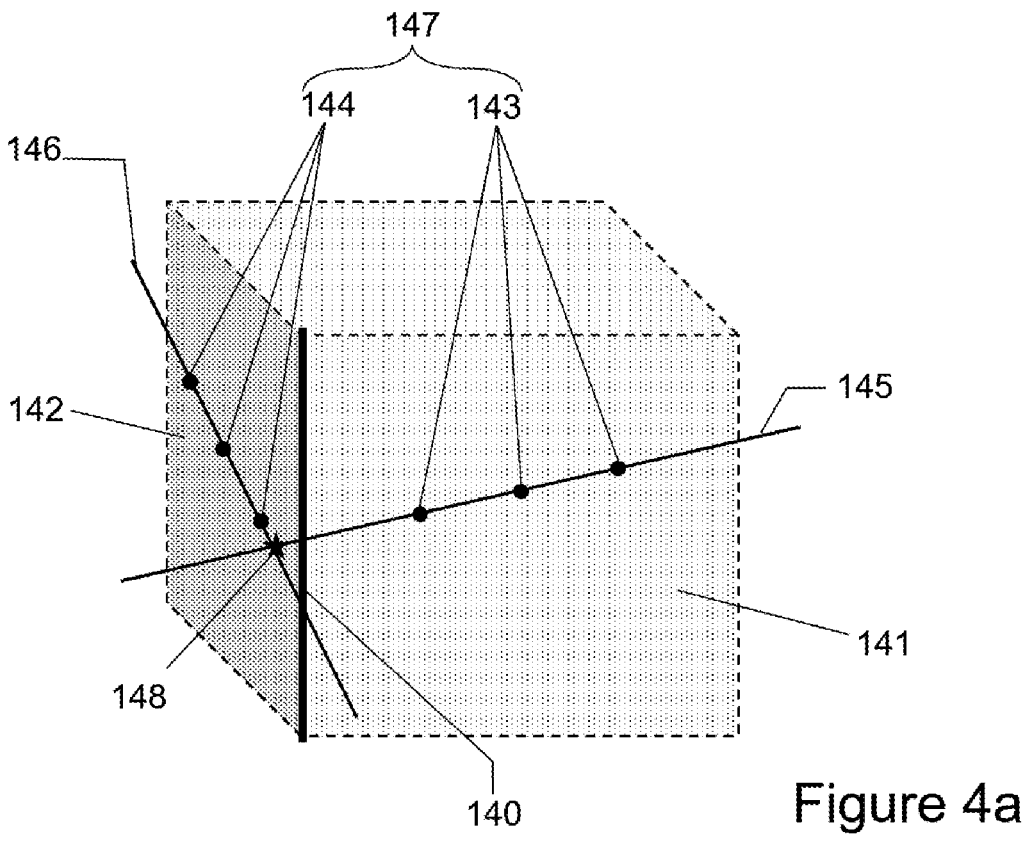
FIG. 4a shows the generation of the set of single measuring points divided into the first and second set of points, the first and second lines, and the vertex as the intersection point.

The schematics of a specific embodiment of deriving a respective alignment deviation 149 from the set of deviations is shown in FIG. 4*a*. The first object edge 140, defined as the intersection of the first flat surface 141 and the second flat surface 142 is depicted. The derivation of the alignment deviations for the second 150, and if applicable, for the third 160 and any further object edges is analogous.

The single point measurement unit measures the first measurement data for the set of single measuring points 147 comprising at least two points in the first flat surface 141 and at least two points in the second flat surface 142. The points comprised by the set of single measuring points 147, and the single point measurement unit lay in a common plane.

The set of single measuring points 147 is divided into the first set of points 143 laying on the first 141 and the second set of points 144 laying on the second flat surface 142. The weighted fitting method is then used to define the first lines 145 and the second line 146 for the respective flat surfaces by the coordinates of set of points in the same flat surface. The vertex of the object edge 140 is determined as the intersection point 148 of the first line 145 and the second line 146. The respective alignment deviation 149 for the object edge 140 is calculated based on the distance of the object edge 140 and the intersection point 148. The deviation 149 might be equal to the distance of the intersection point 148 from the object edge 140 in scalar or vector form.

Figure 4B:
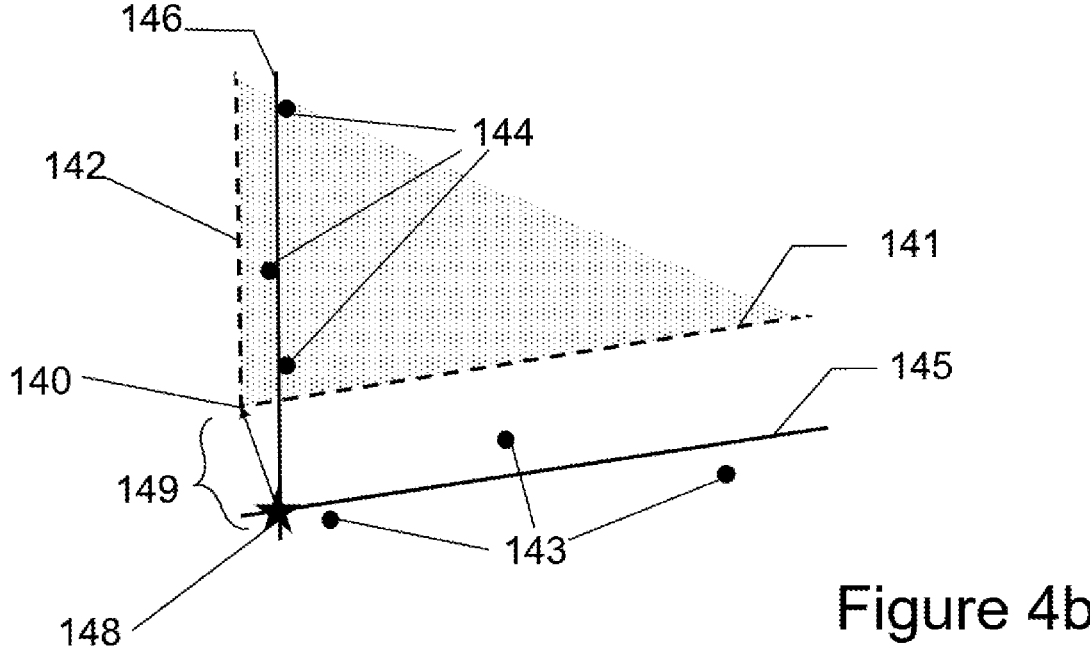
FIG. 4b shows the position of the first and second set of points, the first and second lines, and the vertex as the intersection point viewed along the object edge.

For a better understanding on the method to derive deviation 149 FIG. 4*b* shows the position of the first set of points 143, the first line 145, the second set of points 144, the second line 146 and the vertex as the intersection point 148 viewed along the first object edge 140. The scattering of the points is not according to scale.

Alternatively, the common plane defined by the set of single measuring points 147 may be derived first. The common plane might be constrained to include the single point measurement unit as its origin. In this embodiment the first 145 and second line 146 might be projected to the common plane. The vertex in this embodiment might be defined as the intersection of the projections of the first and second line.

In some specific embodiments for at least one of the object edges 140,150,160, the set of single measuring points 147 are acquired in a continuous scan, i.e. the rate of change for the first angle 64 and the second angle 54 are respectively constant during the acquisition process.

In some specific embodiments, a single tilting or rotation action of the single point measurement unit generates the given sets of measurement points. This means that the first angle 64 or the second angle 54 remains fixed during the generation for all points for the set of single measuring points 147.

In some specific embodiments, the set of measuring points 147 lay in a plane perpendicular to the respective object edges.

In some specific embodiments one of the selected object edges 140,150,160 is vertical.

Needless to say that the features of the specific embodiments might be combinable with each other if the geometry of the setting 2 allows that combination, e.g. for a vertical object edge 140,150,160 with perpendicular first 141,151, 161 and second surfaces 142,152,162, while the points in the set of measuring points 147 lay in a plane perpendicular to the vertical object edge 140,150,160 and acquired so, that the first angle 64 remained fixed during the acquisition.

While the field calibration method is configured to be executed solely using uncooperative, diffusely scattering targets, in some embodiments of the method one or more points in one or more sets of single measuring points 147 generated in the flat surfaces 141,142,151,152,161,162 might be a reference marker, in particular a retroreflector. This is especially beneficial if the absolute position of the reference marker is to be merged with the calibration point cloud. The calibration parameters according to this embodiment may further comprise the absolute position of the reference markers.

The computing unit 30 comprising wireless interface 72, or the wired interface with equivalent functionality, may transfer the point cloud representing the setting 2 and/or the calibration point cloud 130 merged with the absolute coordinate of the reference marker to the further survey instruments, to the further computing units or to the server. Furthermore, the computing unit 30 may also receive the point cloud representing the setting 2 and merged with the absolute coordinate of the reference marker via the same interface 72. Needless to say that a survey instrument 40 comprising the wireless interface 71, or the wired interface with equivalent functionality might be also capable carrying out the same operations.

In one embodiment of the method the computing unit 30 categorizes the detected object edges according to the merit function. The merit function may comprise information on at least one of the following: 1) the bending radius of the object edge 140,150,160, 2) the length of the object edge 140,150, 160, 3) the corner angle, 4) angles of incidence for the first 141,151,161 and the second flat surfaces 142,152,162, 5) flatness of the first 141,151,161 and second flat surfaces 142,152,162, or 6) the mean intensity of the first 141,151, 161 and second flat surfaces 142,152,162. The computing unit 30 might give lower weight for the object edges with low merit value during the optimization of calibration parameters or completely discard them from the further steps of the calibration method.

Although aspects are illustrated above, partly with reference to some specific embodiments, it must be understood that numerous modifications and combinations of different features of the embodiments can be made. All of these modifications lie within the scope of the appended claims.

The invention claimed is:

1. A survey instrument comprising a single point measurement unit, a point cloud measuring module, and a computing unit, wherein the single point measurement unit is configured to generate first measurement data comprising a distance, an elevation angle, and an azimuth angle of a single point, the point cloud measuring module
has a fixed pose relative to the single point measurement unit, and
is configured to generate, by scanning a setting, second measurement data comprising coordinates of a plurality of scan points, the computing unit stores calibration parameters comprising the fixed pose between the single point measurement unit and the point cloud measuring module, wherein the survey instrument is configured to execute a calibration functionality in which the following calibration procedure is automatically causes the point cloud measuring module to acquire second measurement data as a calibration point cloud, the computing unit to identify at least two non-parallel object edges in the calibration point cloud, for each of the at least two object edges:
the single point measurement unit to scan across the object edge, wherein a set of single measuring points including at least two points on each flat surfaces of the object edge is acquired, the single measuring points laying on a straight-line scan-path,
the computing unit to derive a vertex formed by the distribution of the single measuring points, the vertex corresponding to the object edge,
the computing unit to update calibration parameters based on the alignment of the object edges and the derived vertices.

2. The survey instrument according to claim 1, wherein the computing unit, the point cloud measuring module, and the single point measurement unit arranged to a single, portable survey instrument.

3. The survey instrument according to claim 1, wherein the point cloud measuring module is a laser scanning module.

4. The survey instrument according to claim 1, wherein the point cloud measuring module is laterally arranged on the survey instrument.

5. The survey instrument according to claim 1, wherein the single point measurement unit comprises a targeting/rangefinder unit configured to be tilted around a tilting axis, and at least a first angle sensor, wherein the first angle sensor is configured to measure a first angle as a tilting angle of the targeting/rangefinder unit, and wherein the computing unit is configured to retrieve the first angle.

6. The survey instrument according to claim 5, wherein the single point measurement unit is mounted on a base and configured to be rotated around a rotation axis, and wherein the survey instrument comprises a second angle sensor configured to measure a second angle of the single point measurement unit relative to the base, and wherein the computing unit is configured to retrieve the second angle.

7. A method for calibrating of the survey instrument according to claim 1, wherein the method comprises the steps of:

acquiring second measurement data as the calibration point cloud with the point cloud measuring module identifying at least two non-parallel object edges in the calibration point cloud for each of the at least two object edges:
scanning across the object edge with the single point measurement unit wherein the set of single measuring points including at least two points on each flat surfaces of the object edge is acquired, the single measuring points laying on a straight-line scan-path deriving the vertex formed by the distribution of the single measuring points, the vertex corresponding to the object edge, updating calibration parameters based on the alignment of the object edges and the derived vertices.

8. The method according to claim 7, wherein the vertex is derived according to the steps of:

dividing the set of single measuring points into a first set of points laying on the first flat surface and a second set of points laying on the second flat surface, determining a respective first line and a respective second line for each of the object edges with the computing unit by fitting the first and second set of points using a weighted fitting method, determining the vertices, for each of the object edges with the computing unit, as the respective intersection point of the first and second lines.

9. The method according to claim 7 wherein, for at least one of the object edges, the set of single measuring points lay in a plane perpendicular to the respective object edge.

10. The method according to claim 7, wherein for at least one of the object edges, the set of single measuring points are acquired in a continuous scan, wherein the rate of change for the first angle and the second angle are respectively constant during the acquisition process.

11. The method according to claim 7, wherein at least one point measured in at least on the flat surfaces of one of object edges is a reference marker.

12. The method according to claim 11, wherein calibration parameters further comprises an absolute position of the reference marker.

13. The method according to claim 7, wherein the first object edge and the second object edge are perpendicular to each other.

14. The method according to claim 7, wherein the selection of the object edges is based according to a merit function which comprises a parameter that is based on at least one of:

a bending radius of the object edge, a length of the object edge, a corner angle angles of incidence for the first and second flat surface, flatness of the first and second flat surfaces, or a mean intensity of the first and second flat surfaces.

15. A computer program product stored in a non-transitory computer-readable medium for a survey instrument according to claim 1.

16. A computer program product stored in a non-transitory computer-readable medium which, when executed by a computing unit, causes the automatic execution of the steps of the method according to claim 7.

17. A computer program product stored in a non-transitory computer-readable medium which, when executed by a computing unit, causes the automatic execution of the steps of the method according to claim 14.

* * * * *